No. 619,361. Patented Feb. 14, 1899.
D. B. STEPHENS.
METALLIC RIM RUBBER TREAD HORSESHOE.
(Application filed Apr. 6, 1898.)
(No Model.)
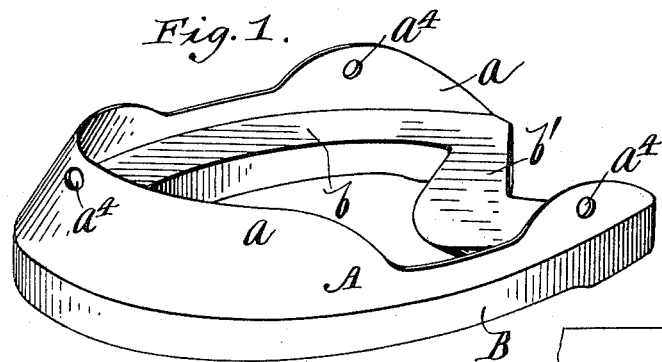
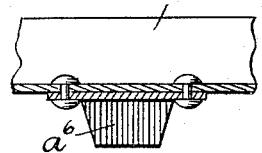
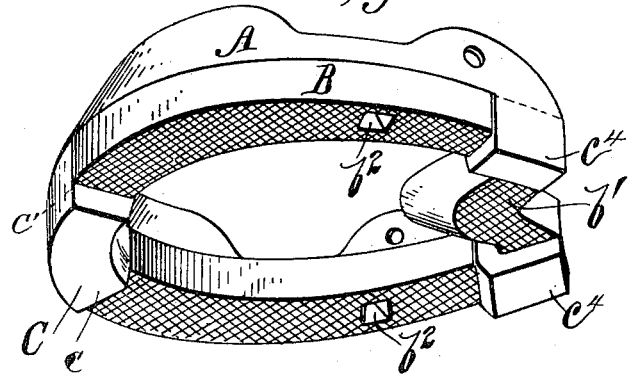
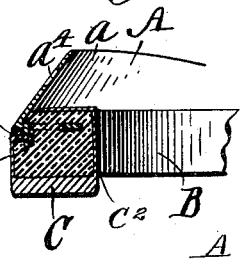
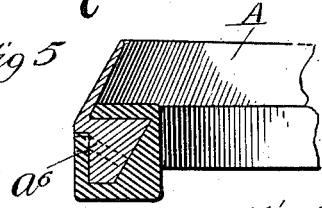
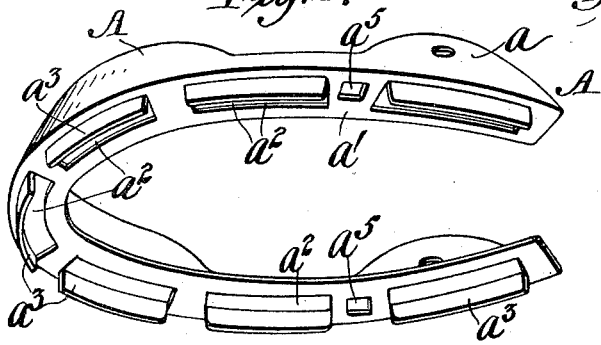
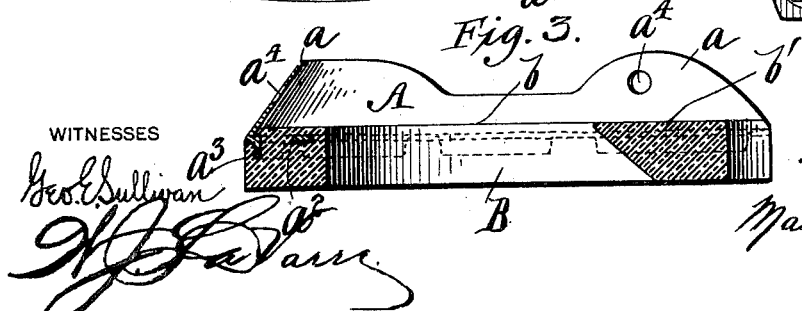
WITNESSES
Geo. E. Sullivan
INVENTOR
Dabney B. Stephens
by his Attys
THE NORRIS PETERS CO., PHOTO-LITHO., WASHINGTON, D. C.

UNITED STATES PATENT OFFICE.

DABNEY BALL STEPHENS, OF MINNEAPOLIS, MINNESOTA, ASSIGNOR OF ELEVEN-SIXTEENTHS TO ANDREAS M. MILLER, JAMES G. HARRIS, AND WILLIAM B. TOPHAM, OF DULUTH, MINNESOTA.

METALLIC-RIM RUBBER-TREAD HORSESHOE.

SPECIFICATION forming part of Letters Patent No. 619,361, dated February 14, 1899.

Application filed April 6, 1898. Serial No. 676,658. (No model.)

*To all whom it may concern:*

Be it known that I, DABNEY BALL STEPHENS, a citizen of the United States, residing at Minneapolis, in the county of Hennepin and State of Minnesota, have invented certain new and useful Improvements in Metallic-Rim Rubber-Tread Horseshoes; and I do hereby declare the following to be a full, clear, and exact description of the invention, such as will enable others skilled in the art to which it appertains to make and use the same.

My invention relates to metallic-rim rubber-tread horseshoes; and it consists of a single piece of rubber made in the shape of a horse's hoof and vulcanized to a metallic rim, said rim comprising in its construction an upwardly and inwardly inclined wall and an inwardly-extending horizontal flange, the latter provided with long spaced apertures and long downwardly-extending projections, said projections being embedded in the rubber base and the upper surface of the horizontal flange of the metallic attaching-rim being covered with rubber and connected to the tread portion by long webs of rubber, which extend through the long spaced openings in said flange.

It also consists in providing a horseshoe of such construction with novelly-constructed toe and heel calks and with means for securing the sure insertion of securing-nails.

My present invention is an improvement on my Letters Patent No. 592,261, granted October 26, 1897, in which the rubber tread is described as being sprung onto the metallic attaching-rim. I have found after considerable experimenting and an outlay of large sums of money that the most practical way to construct the shoe is to form the metallic attaching-rim with long spaced openings having long downwardly-extending projections, the latter being embedded in the rubber tread portion, the front or toe metal projection being relatively deeper, thicker, and heavier than said other projection and having lateral openings through it at any desired degree of inclination, but no vertical aperture back of it, as the other projections have, and to vulcanize the solid-rubber tread portion onto the said metallic attaching-rim in such a manner that the upper surface of the horizontal flange of said metallic attaching-rim will be covered with rubber and said rubber surface will be connected with the rubber tread portion proper by long webs of rubber, which extend through the long openings in said attaching-web and through the lateral openings of said toe projection.

In the accompanying drawings, Figure 1 is a perspective view of a completed metallic-rim rubber-tread horseshoe made in accordance with my invention. Fig. 2 is a detail perspective view of the metallic-rim-attaching portion. Fig. 3 is a vertical longitudinal section through the completed horseshoe. Fig. 4 is a detail fragmentary view of the front toe-calk, showing the latter formed separately from the attaching-rim. Fig. 5 is a view, partly in section, through the front end of the shoe on the center line of the calk, showing one form of toe-calk. Fig. 6 is a front view of a portion of my improved shoe and showing the rubber broken away to disclose the lateral attaching-openings. Fig. 7 is a perspective view of a shoe, looking at the under side of the same, showing the toe and heel calks; and Fig. 8 is a view, partly in section, through the front end of the shoe on the line of the toe-calk.

A in the drawings represents a metallic attaching-rim, which is shaped to conform to the general outline of a horse's hoof, having an upwardly and inwardly extending curved wall $a$, which fits and partially surrounds the outer surface of the horse's hoof, and is also formed with an inwardly-extending horizontal flange $a'$. At suitable intervals in this horizontal flange it is stamped out or drop-forged to form long openings $a^2$ $a^2$ and downwardly-extending projections $a^3$, the projections being practically the same in length as the openings, the material stamped or forged out to form the openings constituting the projections. The upwardly-extending wall of the attaching-rim is provided with openings $a^4$ to receive nails or screws, which serve as an additional means of securing the shoe to the horse's hoof. The inwardly-extending horizontal flange is provided with holes $a^5$ to receive nails driven into the hoof from the under side. The inwardly-extending horizontal flange $a'$ is also preferably formed with a downwardly-extending solid-metal toe-calk $a^6$ and may be constructed with similarly-constructed heel-calks or the calks may be secured to said flange $a'$ in any suitable manner, as shown in Fig. 4. The toe-calks when constructed as shown in Figs. 4, 5, and 6 are formed with lateral openings $a^8$ for the reception of rubber as the tread portion is being vulcanized or pressed onto the rim, thus forming a very convenient and practical means of firmly securing the tread portion to the calks. I regard this as an important feature of my invention.

In the construction of calks just described, which is my preferred construction, the rubber tread portion entirely covers the same. In the form of calk shown in Figs. 7 and 8, which will be hereinafter specifically described, they are applied on the outside of the rubber tread portion.

The tread portion B of the shoe consists of a solid piece of rubber formed by vulcanizing the same onto the metallic attaching-rim. The metallic attaching-rim is placed in the mold and the rubber poured or pressed into the mold, so as to form a tread portion of desired thickness and shape, and to also cover the upper surface of the inwardly-extending flange of the attaching-rim, so as to form a rubber-surfaced contact for the under side of the horse's hoof. In vulcanizing the tread portion or base onto the metallic attaching-rim the rubber-surfaced portion $b$ just described will be connected to the tread portion proper by long webs of rubber, which extend through the long openings $a^2$ in the metallic attaching-rim, and the long downwardly-extending projections $a^3$ will be embedded in the tread portion proper, so that the tread portion will be secured to the attaching-rim in a most secure and satisfactory manner. If desired, the rubber tread portion may be formed with a frog-protecting portion $b'$, as shown in Figs. 1 and 2, and the under surface of this portion may be roughened, if desired. The under surface of the rubber tread portion may be roughened, as shown in Fig. 7, and may be formed with countersunk depressions $b^2$, which are in a line with the nail-holes $a^5$ in the metallic attaching-rim, so that should it be desired to further secure the shoe to a horse's hoof nails may be driven through the rubber base in a line with the said depressions $b^2$ and their entrance through the holes $a^5$ in the metallic attaching-rim will be insured. As stated above, the toe-calks may be constructed and applied as shown in Figs. 7 and 8, in which figures, C represents a toe-calk which is constructed of metal and consists of a thickened or tread portion proper, $c$, and thin attaching ends $c'$ $c^2$. The attaching end $c'$ is provided with an engaging tooth or pin $c^3$, which passes through one of the downwardly-extending projections $a^3$ of the metallic attaching-rim, and the other end $c^2$ is extended up and over and bent down upon the rubber tread portion, as shown in Fig. 8. By this construction and arrangement the toe-calk will be securely held in place on the tread portion. Where such a construction is employed, the heel-calks $c^4$ $c^4$ may be secured to the rubber base portion in practically the same manner.

By the constructions and arrangements just described I am enabled to produce a solid soft-tread shoe which can be readily applied to a horse's hoof and which will not be open to the objection of not affording sufficient ventilation and to the further objection of being composed of numerous and separable parts, which are liable to become separated and lost. By the use of these shoes the horse in traveling over concrete roads or stone pavements will not be jarred, as with the use of iron shoes, and with the use of these shoes the horse's feet are prevented from being cut by calking and the liability of injury to man or animal from being kicked and of the horse slipping and corns forming on the feet is lessened.

Having now described my invention, what I claim as new, and desire to secure by Letters Patent, is—

1. A metallic-rim rubber-tread horseshoe comprising in its construction a base portion constructed of a single piece of solid rubber made in the shape of a horse's hoof and vulcanized or pressed onto a metallic rim, said rim comprising in its construction an upwardly and inwardly inclined wall and an inwardly-extending horizontal flange, the latter provided with long spaced apertures and long, downwardly-extending projections, said projections being embedded in the rubber base and the upper surface of the horizontal flange of the metallic attaching-rim being covered with rubber and connected to the tread portion by long webs of rubber which extend through the long spaced openings in said flange, substantially as described.

2. A metallic-rim rubber-tread horseshoe comprising in its construction a base portion constructed of a single piece of solid rubber made in the shape of a horse's hoof and vulcanized or pressed onto a metallic rim, said rim comprising in its construction an upwardly and inwardly inclined wall and an inwardly-extending horizontal flange, the latter provided with long spaced apertures and long, downwardly-extending projections, said projections being embedded in the rubber base and the upper surface of the horizontal flange of the metallic attaching-rim being covered with rubber and connected to the tread portion by long webs of rubber which extend through the long spaced openings in said flange, and metallic toe and heel calks, substantially as described.

3. A metallic-rim rubber-tread horseshoe comprising in its construction a base portion constructed of a single piece of solid rubber made in the shape of a horse's hoof and vulcanized or pressed onto a metallic rim, said rim comprising in its construction an upwardly and inwardly inclined wall and an inwardly-extending horizontal flange, the latter provided with spaced apertures and downwardly-extending projections, said projections being embedded in the rubber base and the upper surface of the horizontal flange of the metallic attaching-rim being covered with rubber and connected to the tread portion proper by long webs of rubber which extend through the spaced openings in said flange, and metallic calks provided with lateral openings for the passage through them of connecting-webs of rubber, the calks being entirely surrounded by the rubber tread portion of the attachment, substantially as described.

4. A metallic-rim rubber-tread horseshoe comprising in its construction a base portion constructed of a single piece of solid rubber made in the shape of a horse's hoof and vulcanized or pressed onto a metallic rim, said rim comprising in its construction an upwardly and inwardly inclined wall and an inwardly-extending horizontal flange, the latter provided with long spaced apertures and long, downwardly-extending projections, said projections being embedded in the rubber base and the upper surface of the horizontal flange of the metallic attaching-rim being covered with rubber and connected to the tread portion proper by long webs of rubber which extend through the long spaced openings in said flange, the said flange being also provided with nail-holes, metallic toe and heel calks, the end calks being entirely surrounded by the rubber constituting the tread portion; and countersunk depressions on the under side of the tread portion to assist in driving securing-nails, substantially as described.

In testimony whereof I hereunto affix my signature in presence of two witnesses.

DABNEY BALL STEPHENS.

Witnesses:
JAMES T. WATSON,
JAMES G. HARRIS.